(12) United States Patent
Sakai et al.

(10) Patent No.: US 7,170,662 B2
(45) Date of Patent: Jan. 30, 2007

(54) OPTICAL LENS SYSTEM, OPTICAL SCANNING APPARATUS, AND IMAGE FORMING APPARATUS

(75) Inventors: Toshio Sakai, Nagoya (JP); Taizo Matsuura, Jimokuji-cho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 160 days.

(21) Appl. No.: 10/962,683

(22) Filed: Oct. 13, 2004

(65) Prior Publication Data

US 2005/0078344 A1  Apr. 14, 2005

(30) Foreign Application Priority Data

Oct. 14, 2003 (JP) ............................. 2003-353680

(51) Int. Cl.
*G02B 26/08* (2006.01)

(52) U.S. Cl. ...................................... 359/206

(58) Field of Classification Search ................ 359/205, 359/206

See application file for complete search history.

(56) References Cited

U.S. PATENT DOCUMENTS

| | | | |
|---|---|---|---|
| 5,408,360 A | | 4/1995 | Nakanishi |
| 5,600,495 A | * | 2/1997 | Sekikawa ................... 359/819 |
| 6,081,386 A | | 6/2000 | Hayashi et al. |
| 6,229,656 B1 | * | 5/2001 | Omura ........................ 359/204 |
| 2002/0163571 A1 | | 11/2002 | Suhara et al. |

FOREIGN PATENT DOCUMENTS

| | | |
|---|---|---|
| JP | A 5-157901 | 6/1993 |
| JP | A 11-316350 | 11/1999 |
| JP | A 2000-352679 | 12/2000 |
| JP | B2 3196709 | 6/2001 |
| JP | A 2002-365576 | 12/2002 |

\* cited by examiner

*Primary Examiner*—Euncha P. Cherry
(74) *Attorney, Agent, or Firm*—Oliff & Berridge, PLC

(57) ABSTRACT

An optical lens system including a plurality of optical lenses which cooperate with each other to transmit a laser beam deflected in a main scanning direction to scan an object in the main scanning direction, and which include a first lens which is formed of a resin and has a tilt correction function, and at least one second lens which is remoter from the object than the first lens on an optical path. The first lens includes an effective lens portion which has a possibility that the laser beam is transmitted therethrough. The effective lens portion has an incidence surface to which the laser beam is incident in an optical-axis direction, and an outgoing surface from which the laser beam outgoes in the optical-axis direction, and at least one of the incidence surface and the outgoing surface is curved outward in a sub-scanning direction perpendicular to the main scanning direction and the optical-axis direction. The first lens further includes at least one first ineffective lens portion which has no possibility that the laser beam is transmitted therethrough, and which is located adjacent the effective lens portion in the sub-scanning direction. In a cross section of the first lens taken along a plane perpendicular to the main scanning direction, the at least one first ineffective lens portion does not project outward from the outward curved surface of the effective lens portion in the optical-axis direction.

20 Claims, 6 Drawing Sheets

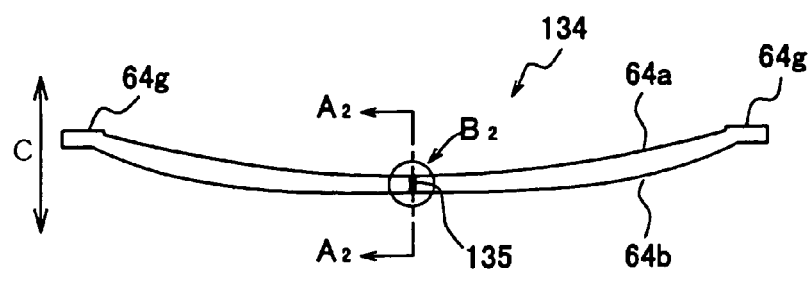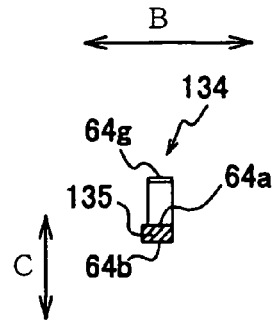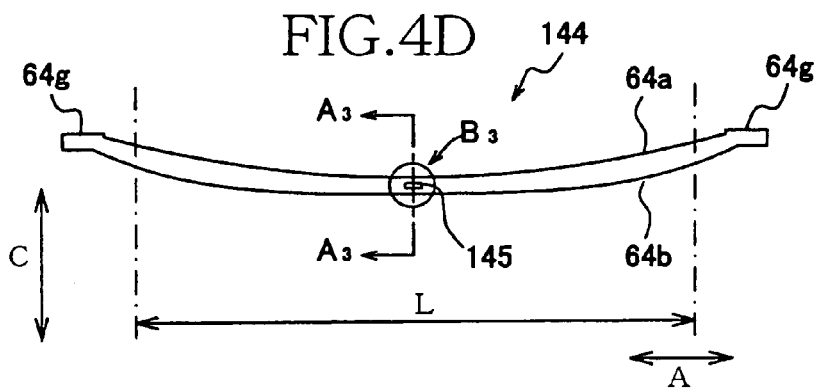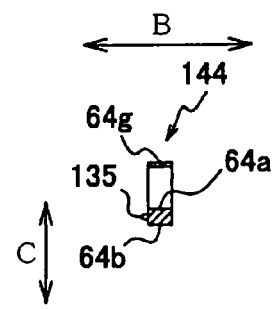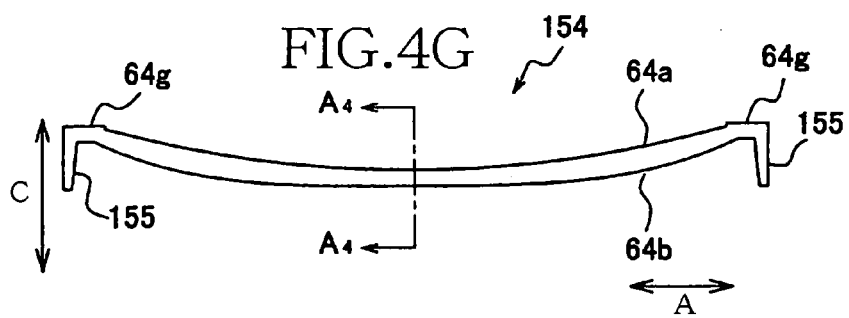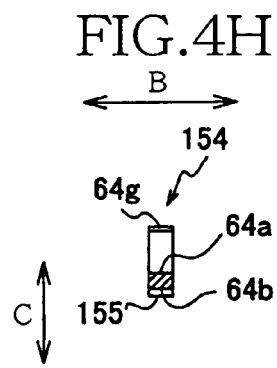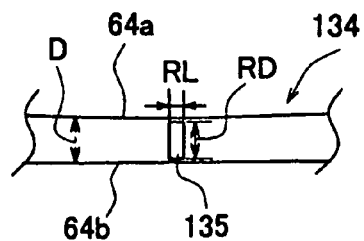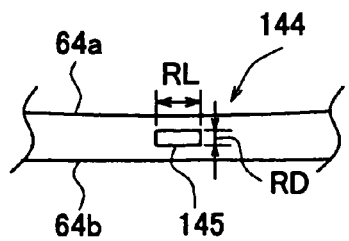

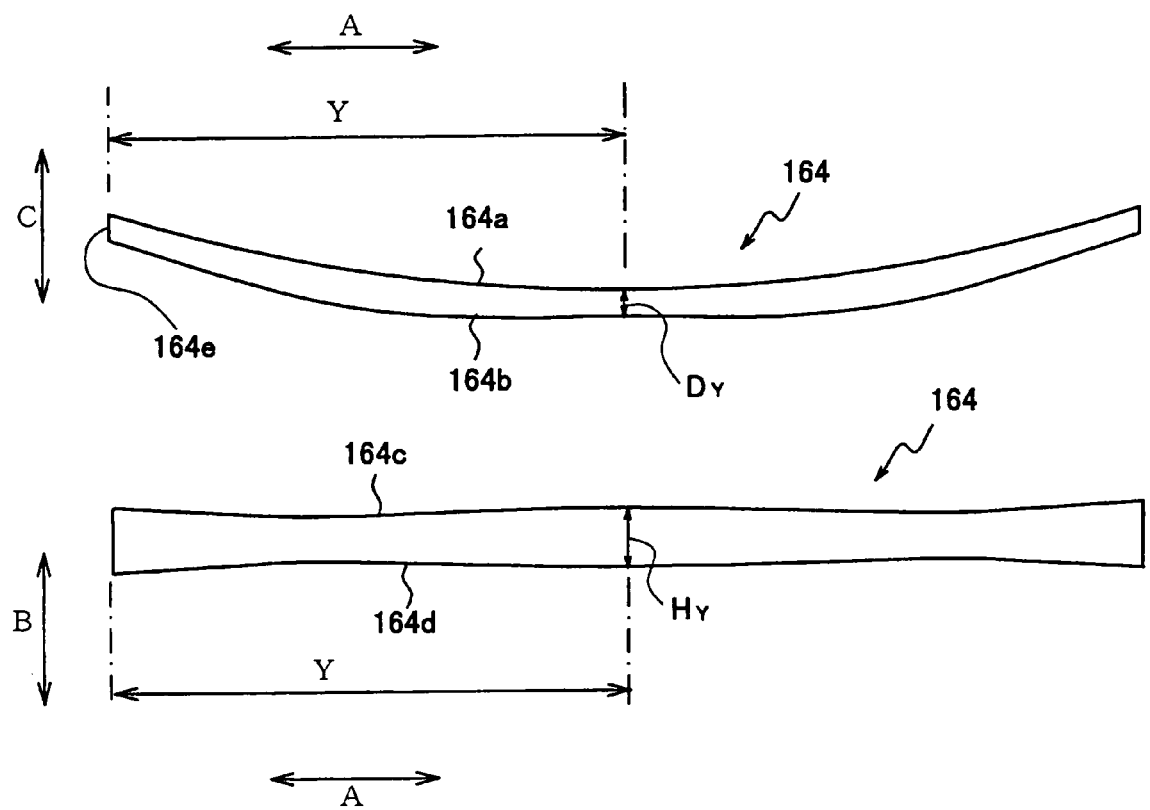

PRIOR ART

OPTICAL LENS SYSTEM, OPTICAL SCANNING APPARATUS, AND IMAGE FORMING APPARATUS

The present application is based on Japanese Patent Application P2003-353680 filed on Oct. 14, 2003, the contents of which are incorporated herein by reference.

BACKGROUND OF THE INVENTION

1. Field of the Invention

The present invention relates to an optical lens system including a lens that has a tilt correction function and enjoys a decreased dimension in a sub-scanning direction without producing distortion or warpage of an effective portion of the lens that transmits a laser beam.

2. Discussion of Related Art

There has been known a laser printer including an optical scanning device that deflects, with a polygon mirror, a so-called "cylindrical" lens, etc., a laser beam representing an image to be formed, so that the deflected laser beam scans a photosensitive body in a certain direction, i.e., a main scanning direction. The cylindrical lens has a tilt correction function.

In the above-indicated optical scanning device, the laser beam is used to scan the photosensitive body, in the following manner: First, a laser-beam emitter emits the laser beam based on image data representing the image to be formed. Subsequently, the polygon mirror that is driven or rotated by a polygon-mirror drive motor deflects the laser beam in the main scanning direction. After an fθ lens transmits the deflected laser beam, the cylindrical lens corrects a tilt of the leaser beam in a sub-scanning direction perpendicular to both a direction in which the laser beam travels (hereinafter, this direction will be referred to as the "optical-axis direction", if appropriate), and the main scanning direction. Subsequently, a reflect mirror such as a return mirror reflects the laser beam, toward the photosensitive body in the form of a rotatable drum, so that an electrostatic latent image corresponding to the image data is formed on an outer circumferential surface of the photosensitive drum.

It has been proposed to form the cylindrical lens employed by the above-indicated optical scanning device, of a plastic material such as a thermoplastic resin. An example of the cylindrical lens is disclosed by Japanese Patent Application Publication P2000-352679A1 and its corresponding U.S. patent application Publication 2002/0163571A1. This plastic cylindrical lens is formed by compression molding, i.e., first supplying the plastic material to molding dies, subsequently letting the molded plastic material to cool down to a sufficiently low temperature, and then removing the thus formed cylindrical lens from the molding dies.

An example 204 of the above-indicated conventional cylindrical lens is shown in FIGS. 6A and 6B. The conventional cylindrical lens 204 includes an effective lens portion 204a having a possibility that a laser beam is transmitted therethrough, and two rib portions 204b, 204c that are located on either side of the effective lens portion 204a in the sub-scanning direction and project outward from the same 204a in the optical-axis direction.

However, when the above-indicated cylindrical lens is cooled down after it is formed by the compression molding of the plastic material, a temperature difference is produced between a superficial or outer-surface portion, and a core portion, of the cylindrical lens, that is, the outer-surface portion is hardened before the core portion, and subsequently the core portion is hardened little by little. Thus, the rib portions 204b, 204c are hardened before the effective lens portion 204a, so that tensile forces may be produced in the effective lens portion 204a. The tensile forces may cause distortion or warpage of the effective lens portion 204a, and thereby deteriorate optical characteristics of the cylindrical lens 204.

To avoid the above-indicated problems of the conventional cylindrical lens 204, the lens 204 includes a wide margin between the effective lens portion 204a and each of the two rib portions 204b, 204c.

SUMMARY OF THE INVENTION

However, since the conventional cylindrical lens 204 includes the two wide margins between the effective lens portion 204a and the two rib portions 204b, 204c, a dimension of the lens 204 in the sub-scanning direction is increased, which leads to increasing a height dimension of the optical scanning device, or an image forming device employing the optical scanning device, in the sub-scanning direction.

It is therefore an object of the present invention to provide the art of decreasing a sub-scanning-direction dimension of a lens having a tilt correction function, without producing distortion or warpage of an effective portion of the lens that transmits a laser beam.

The above objects may be achieved according to the present invention. According to a first aspect of the present invention, there is provided an optical lens system comprising a plurality of optical lenses which cooperate with each other to transmit a laser beam deflected in a main scanning direction to scan an object in the main scanning direction, and which include a first lens which is formed of a resin and has a tilt correction function, and at least one second lens which is remoter from the object than the first lens on an optical path. The first lens includes an effective lens portion which has a possibility that the laser beam is transmitted therethrough. The effective lens portion has an incidence surface to which the laser beam is incident in an optical-axis direction, and an outgoing surface from which the laser beam outgoes in the optical-axis direction, and at least one of the incidence surface and the outgoing surface is curved outward in a sub-scanning direction perpendicular to the main scanning direction and the optical-axis direction. The first lens further includes at least one first ineffective lens portion which has no possibility that the laser beam is transmitted therethrough, and which is located adjacent the effective lens portion in the sub-scanning direction. In a cross section of the first lens taken along a plane perpendicular to the main scanning direction, the at least one first ineffective lens portion does not project outward from the outward curved surface of the effective lens portion in the optical-axis direction. The at least one second lens may comprise a single lens having an fΘ function of converting a scanning speed at which the deflected laser beam scans the object, or a plurality of lens which cooperate with each other to have the fΘ function. In the last case, the first lens is located, in the optical-lens system, at the position nearest to the object.

A conventional so-called "cylindrical" lens including respective rib portions provided at two opposite ends thereof in a sub-scanning direction, needs to have a great sub-scanning-direction dimension so as to prevent an effective lens portion thereof from being distorted or warped by tensile forces that would otherwise be produced in the effective lens portion However, the first lens of the optical lens system in accordance with the first aspect of the present invention is constructed as follows, and does not include any rib portions as described above. At least one of the incidence surface and the outgoing surface of the effective lens portion of the first lens is curved outward, and in a cross section of the first lens taken along a plane perpendicular to the main scanning direction, the first ineffective lens portion does not project outward from the outward curved surface of the effective lens portion in the optical-axis direction. Thus, the effective lens portion is not distorted or warped, and accordingly the sub-scanning-direction dimension of the first lens need not be increased. More specifically explained, since the first lens need not include any margin portions between the effective lens portion and the first ineffective lens portion, the sub-scanning-direction dimension of the first lens can be decreased.

According to a second aspect of the present invention, there is provided an optical lens system, comprising a plurality of optical lenses which cooperate with each other to transmit a laser beam deflected in a main scanning direction to scan an object in the main scanning direction, and which include a first lens which is formed of a resin and has a tilt correction function, and at least one second lens which is remoter from the object than the first lens on an optical path. The first lens includes an effective lens portion which has a possibility that the laser beam is transmitted therethrough. The effective lens portion has an incidence surface to which the laser beam is incident in an optical-axis direction, and an outgoing surface from which the laser beam outgoes in the optical-axis direction, and at least one of the incidence surface and the outgoing surface is curved inward in a sub-scanning direction perpendicular to the main scanning direction and the optical-axis direction. In a cross section of the cylindrical lens taken along a plane perpendicular to the main scanning direction, the inward curved surface of the effective lens portion is represented by a first curved line defined by a single mathematical function. The first lens further includes at least one first ineffective lens portion which has no possibility that the laser beam is transmitted therethrough, and which is located adjacent the effective lens portion in the sub-scanning direction. In the cross section of the cylindrical lens, the at least one first ineffective lens portion does not project outward, in the optical-axis direction, from at least one second curved line extended from the first curved line according to the single mathematical function. The optical lens system in accordance with the second aspect of the present invention may be combined with any of the features recited in original claims 6 through 19.

The above-described first aspect of the present invention is applied to the optical lens system wherein the incidence and/or outgoing surfaces of the effective lens portion of the first lens are/is curved outward. However, the principle of the present invention is applicable to a first lens wherein incidence and/or outgoing surfaces of an effective lens portion thereof are/is curved inward. The first lens of the optical lens system in accordance with the second aspect of the present invention is constructed as follows, and does not include any rib portions as described above. At least one of the incidence surface and the outgoing surface of the effective lens portion of the first lens is curved inward, and in a cross section of the first lens taken along a plane perpendicular to the main scanning direction, the inward curved surface of the effective lens portion is represented by a first curved line defined by a single mathematical function, and the first ineffective lens portion does not project outward from a second curved line extended from the first curved line according to the mathematical function. This function defines the first curved line and the second curved line, as an edge line of the cross section of the first lens taken along the plane (i.e., an X-Z plane) perpendicular to the main scanning direction (i.e., a Y axis), in an X-Y-Z coordinate space defined by an X axis (i.e., the sub-scanning direction), the Y axis, and a Z axis (i.e., the optical-axis direction). Thus, the effective lens portion of the first lens is not distorted or warped, and accordingly the sub-scanning-direction dimension of the first lens need not be increased. More specifically explained, the sub-scanning-direction dimension of the first lens can be decreased. The single mathematical function may be defined by the following expression: $x^2+z^2=r^2$ where r is a constant.

According to a third aspect of the present invention, there is provided an optical lens system, comprising a plurality of optical lenses which cooperate with each other to transmit a laser beam deflected in a main scanning direction to scan an object in the main scanning direction, and which include a first lens which is formed of a resin and has a tilt correction function, and at least one second lens which is remoter from the object than the first lens on an optical path. In a cross section of the first lens taken along a plane perpendicular to the main scanning direction, two opposite edge lines of the first lens that are opposite to each other in an optical-axis direction in which the laser beam is incident to the first lens, include at least one curved line, and an angle of a tangential line passing through an arbitrary point on each of the two opposite edge lines, relative to the optical-axis direction, falls in a range of from 80 degrees, inclusive, to 100 degrees, inclusive. One of the two opposite edge lines may consist of a straight line. The curved line may be a line curved outward or inward from a straight reference line parallel to a sub-scanning direction perpendicular to the main scanning direction and the optical-axis direction. The optical lens system in accordance with the third aspect of the present invention may be combined with any of the features recited in original claims 6 through 19.

The above-indicated problem of the conventional cylindrical lens can be solved according to the third aspect of the present invention. The first lens of the optical lens system in accordance with the third aspect of the present invention is constructed as follows: In the cross section of the cylindrical lens taken along the plane perpendicular to the main scanning direction, the two opposite edge lines of the first lens that are opposite to each other in the optical-axis direction include at least one curved line, and the angle of the tangential line passing through the arbitrary point on each of the two opposite edge lines, relative to the optical-axis direction, falls in the range of from 80 degrees, inclusive, to 100 degrees, inclusive. Thus, the effective lens portion of the first lens is not distorted or warped, and accordingly the sub-scanning-direction dimension of the first lens need not be increased. That is, the sub-scanning-direction dimension of the first lens can be decreased.

According to a fourth aspect of the present invention, there is provided an optical scanning apparatus comprising a laser-beam emitter which emits, based on image data, a laser beam; a polygon mirror which is rotated by a drive motor to deflect the laser beam in a main scanning direction; and an optical lens system including a plurality of optical lenses which cooperate with each other to transmit the laser beam deflected in the main scanning direction to scan an object in the main scanning direction, and which include a first lens which is formed of a resin and has a tilt correction function, and at least one second lens which is remoter from the object than the first lens on an optical path and has an fΘ function of converting a scanning speed at which the deflected laser beam scans the object. The first lens includes an effective lens portion which has a possibility that the laser beam is transmitted therethrough. The effective lens portion has an incidence surface to which the laser beam is incident in an optical-axis direction, and an outgoing surface from which the laser beam outgoes in the optical-axis direction, and at least one of the incidence surface and the outgoing surface is curved outward in a sub-scanning direction perpendicular to the main scanning direction and the optical-axis direction. The first lens further includes at least one first ineffective lens portion which has no possibility that the laser beam is transmitted therethrough, and which is located adjacent the effective lens portion in the sub-scanning direction. In a cross section of the first lens taken along a plane perpendicular to the main scanning direction, the at least one first ineffective lens portion does not project outward from the outward curved surface of the effective lens portion in the optical-axis direction.

According to a fifth aspect of the present invention, there is provided an image forming apparatus comprising an optical scanning apparatus according to the fourth aspect of the invention; a photosensitive body on which an electrostatic latent image is formed by the laser beam transmitted through the optical lens system of the optical scanning apparatus; a developing device which supplies a developing material to the electrostatic latent image and thereby forms a developing-material image on the photosensitive body; and a transferring device which transfers the developing-material image from the photosensitive body to a transfer object. The transfer object (or target) may be a conveyor belt, or a recording medium such as a sheet of paper. The image forming apparatus may further comprise a fixing device which fixes the developing-material image to the recording medium.

In the optical scanning apparatus in accordance with the fourth aspect of the present invention, or the image forming apparatus in accordance with the fifth aspect of the present invention, the first lens of the optical lens system can be constructed not to include any rib portions as described above, and accordingly can enjoy a decreased sub-scanning-direction dimension. This leads to decreasing a sub-scanning-direction dimension of the optical scanning apparatus including the optical lens system, and eventually decreasing a sub-scanning-direction dimension (i.e., a height dimension) of the image forming apparatus including the optical scanning direction.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 4A is a plan view corresponding to FIG. 2A, showing another cylindrical lens as a fifth embodiment of the present invention;

FIG. 4B is a cross-section view of the cylindrical lens of FIG. 4A, taken along a plane indicated by arrows A2, A2 in FIG. 4A;

FIG. 4C is an enlarged view of a "B2" portion of the cylindrical lens of FIG. 4A;

FIG. 4D is a plan view corresponding to FIG. 2A, showing another cylindrical lens as a sixth embodiment of the present invention;

FIG. 4E is a cross-section view of the cylindrical lens of FIG. 4D, taken along a plane indicated by arrows A3, A3 in FIG. 4D;

FIG. 4F is an enlarged view of a "B3" portion of the cylindrical lens of FIG. 4D;

FIG. 4G is a plan view corresponding to FIG. 2A, showing another cylindrical lens as a seventh embodiment of the present invention;

FIG. 4H is a cross-section view of the cylindrical lens of FIG. 4G, taken along a plane indicated by arrows A4, A4 in FIG. 4G;

FIG. 5A is a plan view corresponding to FIG. 2A, showing another cylindrical lens as an eighth embodiment of the present invention;

FIG. 5B is a front elevation view of the cylindrical lens of FIG. 5A;

DETAILED DESCRIPTION OF THE PREFERRED EMBODIMENTS

Figure 1:
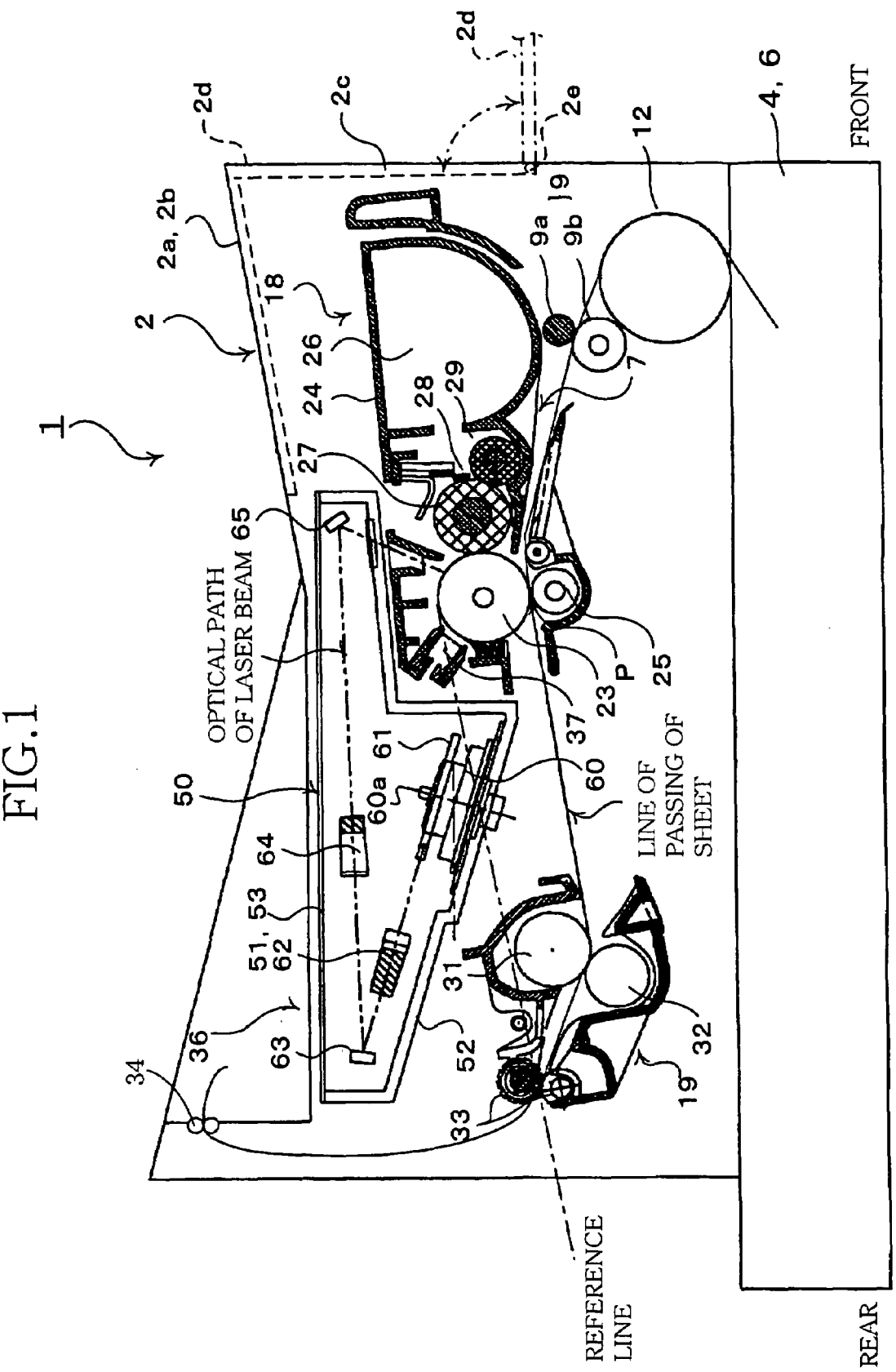
FIG. 1 is a schematic cross-section view of a laser printer to which the present invention is applied.

Hereinafter, there will be described a preferred embodiment of the present invention by reference to the drawings. FIG. 1 shows a laser printer 1 to which the present invention is applied.

<Construction of Laser Printer 1>

As shown in FIG. 1, the laser printer 1 includes a housing 2; a feeding portion or device 4 that feeds recording sheets (each as a recording medium), one by one; a processing unit 18 that forms images on each recording sheet fed from the feeding portion 4; and a fixing device 19. In addition, the laser printer 1 has, in a top portion of the housing 2, a display portion 2a that includes LCDs (liquid crystal displays) and LED (light emitting diodes) and displays, e.g., an operating state of the printer 1; and a control panel 2b that includes various input switches and a power switch and is used by an operator to input, e.g., an operation command to the printer 1. The housing 2 has, in a front and top portion thereof, an opening 2c that can be opened and closed by a lid 2d. The lid 2d is pivotable about an axis line 2e to an opening position where the lid 2d opens the opening 2c, and a closing position where the lid 2d closes the opening 2c. In addition, the housing 2 has, in its top portion, a sheet collect tray 36 that collects the recording sheets on each of which images have been formed. Hereinafter, a right-hand portion of the laser printer 1, shown in FIG. 1, where the display portion 2a and the control panel 2b are attached to the housing 2 will be referred to as the "front" portion thereof and a left-hand portion of the printer 1 will be referred to as the "rear" portion thereof.

<Construction of Feeding Portion 4>

The feeding portion 4 includes a sheet feed tray 6 that is detachably attached to a bottom portion of the housing 2; a sheet push plate, not shown, that is provided in the sheet feed tray 6; and a sheet feed roller 12 and a sheet separate pad, not shown, that are provided above a front end of the sheet feed tray 6. A widthwise dimension of the sheet feed roller 12 that is measured in a direction perpendicular to a sheet feeding direction in which the roller 12 feeds each recording sheet, is shorter than that of the each sheet and, when the roller 12 feeds the each sheet, the roller 12 engages only a generally central portion of the widthwise length of the each sheet. A curved, sheet feed path 7 is provided between the sheet feed roller 12 and an image forming position, P, where a photosensitive drum 23 and a transfer roller 25 are engaged with each other, i.e., a transferring position where toner images carried on the drum 23 are transferred to each recording sheet. In the present embodiment, the laser printer 1 includes the single feeding portion 4. However, the laser printer 1 may be modified to employ a plurality of feeding portions 4.

The curving of the sheet feed path 7 is defined by two guide plates that guide two opposite major surfaces of each recording sheet, respectively. The sheet feed path 7 is provided with not only the sheet feed roller 12 but also two register rollers 9 (9a, 9b) that are located on a downstream side of the sheet feed roller 12, and on an upstream side of the image forming position P, as seen in the sheet feeding direction. The two register rollers 9 include a driven roller 9a and a drive roller 9b.

In the feeding portion 4 constructed as described above, the top one of the recording sheets stacked on the sheet push plate, not shown, is pushed upward against the sheet feed roller 12. As the sheet feed roller 12 is rotated, the top recording sheet is nipped by the roller 12 and the sheet separate pad, not shown, and is fed forward. Thus, the recording sheets are fed, one by one, out of the sheet feed tray 6. Each recording sheet is fed to the register rollers 9, is registered by the same 9, and then is further fed to the image forming position P by the same 9.

<Construction of Processing Unit 18>

The processing unit 18 is provided in the front portion of the housing 2, and is constituted by a drum cartridge including the photosensitive drum 23 as a photosensitive member, a Scorotron-type electric charger 37, and the transfer roller 25 as a transferring device; and a develop cartridge 24 that is detachably attached to the drum cartridge. The develop cartridge 24 includes a toner hopper 26, a develop roller 27 as a developing device, a layer-thickness limiting blade 28, and a toner supply roller 29. The photosensitive drum 23 and the develop roller 27 extend substantially horizontally, and parallel to each other.

The toner hopper 26 is filled with a polymer toner as a sort of developing material that consists of a single non-magnetic component that is chargeable to be electrically positive. As the toner supply roller 29 is rotated, the toner is supplied to the develop roller 27, while being electrically positively charged because of friction caused between the two rollers 27, 29. In addition, as the develop roller 27 is rotated, the toner carried on the outer surface of the roller 27 passes under the layer-thickness limiting blade 28, so that a toner layer having a pre-selected thickness is formed on the roller 27. The rotatable photosensitive drum 23 is engaged with the develop roller 27, and includes a drum body that is grounded, and a photosensitive surface layer that is formed of an organic photosensitive material, e.g., polycarbonate, and is chargeable to be electrically positive].

The Scorotron-type electric charger 37 is provided above the photosensitive drum 27, such that the charger 37 is spaced from the drum 27 by a pre-selected distance so as not to contact directly the same 27. The electric charger 37 is of a Scorotron type that produces a corona discharge from a charging wire such as a tungsten wire and electrically positively charges an object. In the present embodiment, the electric charger 37 electrically charges the photosensitive surface layer of the drum 23 so as to be uniformly positive.

As the photosensitive drum 23 is rotated, the outer surface of the drum 23 is electrically charged to be uniformly positive, by the Scorotron-type electric charger 37, and then the outer surface of the drum 23 is exposed to a high-speed scanning of a laser beam emitted by a scanning unit 50, so that electrostatic latent images corresponding to image data are formed on the outer surface of the drum 23.

As the photosensitive drum 23 is further rotated, the toner carried on the develop roller 27 and electrically positively charged is supplied, owing to the rotation of the roller 27 engaged with the drum 23, onto only the electrostatic latent images formed on the drum 23, i.e., the exposed portions of the uniformly positively changed outer surface of the drum 23 the electric potential of which has been lowered by the exposure to the laser beam. Thus, visible toner images (i.e., developing-material images) are formed on the photosensitive drum 23.

The transfer roller 25 is located under the photosensitive drum 23, such that the roller 30 is engaged with the drum 23. The transfer roller 25 is supported by the above-described drum cartridge, such that the roller 25 is rotatable in a counterclockwise direction as seen in FIG. 1. The transfer roller 25 includes a metallic axis portion, and a roller portion that is formed of an ion-conductive rubber material and covers the axis portion. The metallic axis portion of the transfer roller 25 is connected to a transfer-bias apply power source, not shown, that applies a transfer bias voltage to the axis portion when a transferring operation is carried out. Thus, when each recording sheet is fed between the photosensitive drum 23 and the transfer roller 25, the toner images carried on the outer surface of the drum 23 are transferred, owing to the transfer bias voltage applied to the roller 25, onto the recording sheet, at the image forming position P. The recording sheet carrying the toner images is fed to the fixing device 19.

The processing unit 18 constructed as described above can be detached from the housing 2 through the opening 2c thereof, and can be attached again to the housing 2 through the opening 2c. The processing unit 18 detached from the housing 2 can be separated into the drum cartridge and the develop cartridge 24.

<Construction of Fixing Device 19>

The device 19 is provided on a downstream side of the processing unit 18 in the sheet feeding direction, and includes a single heat roller 31, a press roller 32 that presses each recording sheet against the heat roller 31, and two sheet feed rollers 33 that are provided on a downstream side of the heat and press rollers 31, 32 in the sheet feeding direction. The heat roller 31 is formed of a metal such as aluminum, and is provided with a heating member such as a halogen lamp, While each recording sheet carrying the toner images transferred by the processing unit 18 is fed between the heat roller 31 and the press roller 32, the fixing portion 19 thermally fixes the toner images on the sheet. Then, the recording sheet is fed by the sheet feed rollers 33, to a sheet discharge path where the sheet is discharged by two sheet discharge rollers 34 into the sheet collect tray 36.

<Construction of Scanning Unit 50>

The scanning unit 50 is provided in an upper portion of the housing 2. The scanning unit 50 includes a box-like case 51, and additionally includes a laser-beam emitter, not shown, a polygon-mirror drive motor 60, a polygon mirror 61 that is driven or rotated by the drive motor 60, an fθ lens 62, a return mirror 63, a so-called "cylindrical" lens 64, and a reflect mirror 65 all of which are incorporated by the box-like case 51. Strictly, the so-called "cylindrical" lens 64 is not a cylindrical lens, but hereinafter this lens 64 will be referred to as the cylindrical lens. This lens 64 has a tilt correction function. A laser beam that is emitted by the laser-beam emitter based on the image data and then is reflected by the polygon mirror 61, travels through an optical path, indicated by two-dot chain line in FIG. 1, while the laser beam is reflected by, or transmitted through, the fθ lens 62, the return mirror 63, the cylindrical lens 64, and then the reflect mirror 65 in the order of description, and finally the laser beam is incident, at a high scanning speed, to the outer surface of the photosensitive drum 23. In the present embodiment, the fθ lens 62 and the cylindrical lens 64 cooperate with each other to function as an optical lens system recited in claims.

<Construction of Polygon-Mirror Drive Motor 60 and Polygon Mirror 61>

The polygon-mirror drive motor 60 is provided in the housing 2, such that a portion of the motor 60 is located below a reference line, indicated by one-dot chain line in FIG. 1, that passes through a top portion of the photosensitive drum 23 of the processing unit 18 and a top portion of the heat roller 31 of the fixing device 19. On the other hand, the recording sheet carrying the toner images transferred at the image forming position P needs to be fed by the rotation of the drum 23 and the transfer roller 25, from the processing unit 18 to the fixing device 19. To this end, a bottom portion of the drive motor 60, fixed to a bottom wall 52 of the box-like case 51, is located above a sheet feed path (i.e., a line of passing of sheet, indicated by solid line in FIG. 1) that connects between a bottom portion of the photosensitive drum 23 and a bottom portion of the heat roller 31. The polygon mirror 61 is fixed to an output shaft 60a of the drive motor 60. The polygon mirror 61 has a polyhedral shape and six mirror-finished surfaces. As the polygon mirror 61 is driven or rotated by the drive motor 60, the polygon mirror 61 reflects the laser beam in such a manner that the laser beam is deflected in a main scanning direction. Since the polygon mirror 61 is fixed to the output shaft 60a of the drive motor 60, the mirror 61 is located between the drum 23 and the heat roller 31.

<Construction of FΘ Lens 62 and Return Mirror 63>

The fθ lens 62 is provided above the heat roller 31 constituting a front portion of the fixing device 19. The fθ lens 62 has a scanning-speed converting function, i.e., converts the laser beam reflected by the polygon mirror 61, i.e., the laser beam deflected at a uniform angular speed, into a laser beam deflected at a uniform speed.

The return mirror 63 is provided above the sheet feed rollers 33 constituting a rear portion of the fixing device 19. The return mirror 63 reflects or returns the laser beam outputted by the fθ lens 62, toward a location above the processing unit 18.

<Construction of Cylindrical Lens 64>

The so-called "cylindrical" lens 64 is provided above the polygon-mirror drive motor 60 and the polygon mirror 61, and has a tilt correction function, i.e., corrects a tilt of the laser beam reflected by the return mirror 63, in a sub-scanning direction B perpendicular to a main scanning direction A.

Figure 2A:
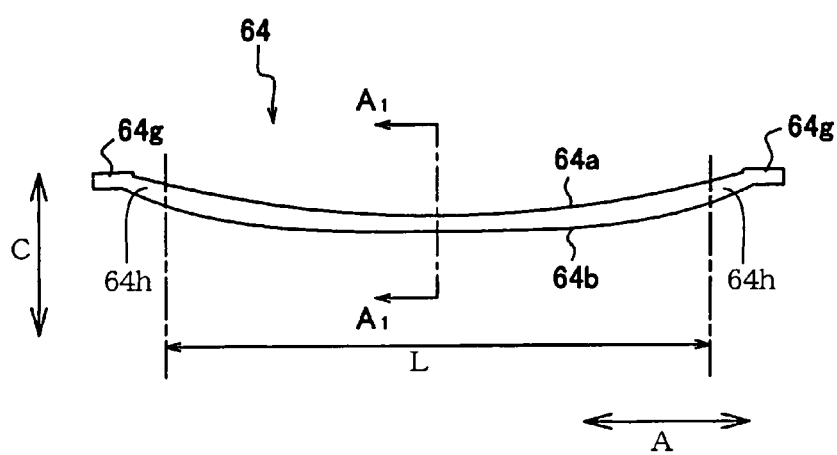
FIG. 2A is a plan view of a so-called "cylindrical" lens that is employed by the printer of FIG. 1 and embodies the present invention.
Figure 2B:
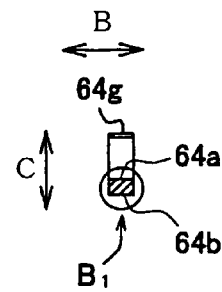
FIG. 2B is a cross-section view of the cylindrical lens, taken along a plane indicated by arrows A1, A1 in FIG. 2A.
Figure 2C:
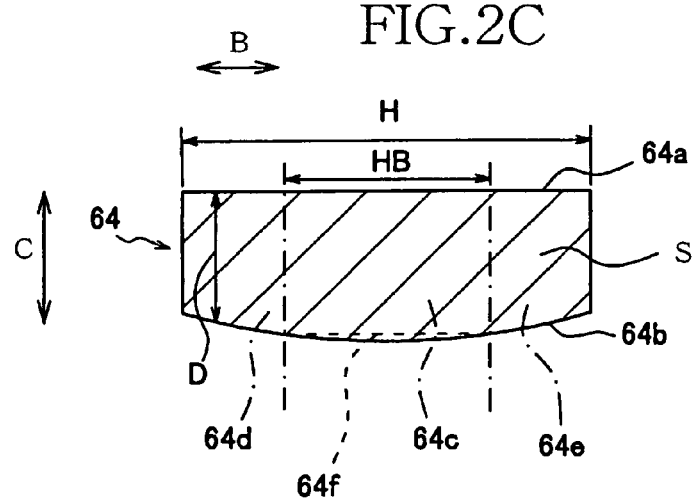
FIG. 2C is an enlarged view of a "B1" portion of the cross-section view of FIG. 2B.

Hereinafter, the cylindrical lens 64 will be described in detail by reference to FIGS. 2A, 2B, and 2C. FIG. 2A is a plan view of the cylindrical lens 64; FIG. 2B is a cross-section view taken along a plane that is perpendicular to the main scanning direction A, and indicated by arrows A1, A1 shown in FIG. 2A; and FIG. 2C is an enlarged view of a cross-sectioned portion B1 shown in FIG. 2B. Here, a direction in which the laser beam reflected by the return mirror 63 travels toward the cylindrical lens 64 is defined as an optical-axis direction C; a direction in which the laser beam reflected by the return mirror 63 and then transmitted through the cylindrical lens 64 is deflected is defined as the main scanning direction A; and a direction perpendicular the optical-axis direction C and the main scanning direction is defined as the sub-scanning direction B.

As shown in FIGS. 2A and 2B, the cylindrical lens 64 is formed of a resin having a low degree of hygroscopicity, such as non-crystalline or crystalline olefinic resin, and has a generally rectangle-columnar shape that is so curved as to have a symmetrical shape with respect to the plane A1, A1, shown in FIG. 2A, that is perpendicular to the main scanning direction A and is equidistant from two opposite ends of the lens 64 in the same direction. More specifically described, as shown in FIG. 2A, the cylindrical lens 64 has an incidence surface 64a to which the laser beam reflected by the return mirror 63 (FIG. 1) is incident; and an outgoing surface 64b from which the laser beam incident to the incidence surface 64a outgoes. The incidence surface 64a is curved such that a central portion of the surface 64a is concave, or curved inward, as seen in the optical-axis direction C; and the outgoing surface 64b is curved such that a central portion of the surface 64b is convex, or curved outward, as seen in the same direction.

In addition, as shown in FIG. 2C, the cylindrical lens 64 includes an effective lens portion 64c, a first ineffective lens portion 64d, and a second ineffective lens portion 64e. The effective lens portion 64c is defined as a portion of the lens 64 that has the possibility of transmitting the laser beam reflected by the return mirror 63; and each of the first and second ineffective lens portions 64d, 64e is defined as a portion of the lens 64 that has no possibilities of transmitting the laser beam reflected by the return mirror 63. The first and second ineffective lens portions 64d, 64e are located on either side of the effective lens portion 64c in the sub-scanning direction B.

Next, respective cross sections of the cylindrical lens 64, taken along respective planes perpendicular to the main scanning direction A, will be described by reference to FIG. 2C. The cross section taken along the plane A1, A1 perpendicular to the main scanning direction A, and the other cross sections taken along the other planes perpendicular to the same direction have a same dimension, H (mm), in the sub-scanning direction B; the respective effective lens portions 64c of all those cross sections have a same dimension, HB (mm), in the sub-scanning direction B; the respective incidence surfaces (i.e., respective incidence-side edge lines) 64a of all those cross sections are curved in a same manner (i.e., straight); and the respective outgoing surfaces (i.e., respective outgoing-side edge lines) 64b of all those cross sections are curved in a same manner. However, those cross sections have different dimensions, D (mm), in the optical-axis direction C. Here, the cross section taken along the plane A1, A1 will be described as a representative of all those cross sections taken along the planes perpendicular to the main scanning direction A, and the description of the other cross sections is omitted.

First, the incidence surface (i.e., incidence-side edge line) 64a of the cross section taken along the plane A1, A1 is entirely described by a straight line as a sort of curved line. Thus, in the cross section taken along the plane A1, A1, the respective incidence surfaces (i.e., respective incidence-side edge lines) 64a, 64a of the first and second ineffective lens portions 64d, 64e do not project from the incidence surface (i.e., incidence-side edge line) 64a of the effective lens portion 64c in the optical-axis direction C. In addition, the outgoing surface (i.e., outgoing-side edge line) 64b of the cross section taken along the plane A1, A1 is entirely described by a convex, or outward curved, line as another sort of curved line. Thus, in the cross section taken along the plane A1, A1, the respective outgoing surfaces (i.e., outgoing-side edge lines) 64b of the first and second ineffective lens portions 64d, 64e do not project from the outgoing surface 64b (i.e., outgoing-side edge line) of the effective lens portion 64c, i.e., a convex, or outward curved, surface 64f of the same 64c, shown in FIG. 2C, in the optical-axis direction C.

The cylindrical lens 64 has, as two opposite end portions thereof as seen in the main scanning direction A, two third ineffective lens portions 64h that has no possibilities of transmitting the laser beam reflected by the return mirror 63. The two third ineffective lens portions 64h are located on either side of the effective lens portion 64c in the main scanning direction A, and include two positioning projections 64g, 64g, respectively. When the cylindrical lens 64 is assembled into the scanning unit 50, the two positioning projections 64g, 64g are used to position the lens 64 in the optical-axis direction C.

Respective shapes of the incidence surface 64a and the outgoing surface 64b of the cylindrical lens 64 are so pre-determined that the lens 64 has the above-described tilt correction function.

The Inventors have carried out an extensive study to decrease the dimension of the cylindrical lens 64 in the sub-scanning direction B, and have obtained the results that the cylindrical lens 64 preferably has the following structural features (A) through (E):

(A) The cylindrical lens 64 preferably satisfies the following expression (1) defining a relationship between a maximum dimension $D_{MAX}$ (mm) in the optical-axis direction C and a maximum dimension $H_{MAX}$ (mm) in the sub-scanning direction B (see FIG. 2C):

$$H_{MAX} \leq 3D_{MAX} \qquad \text{Expression (1)}$$

(B) The cylindrical lens 64 preferably satisfies the following expression (2) defining a relationship between a minimum cross-section area $S_{MIN}$ (mm$^2$) of respective cross-section areas S taken along the respective planes perpendicular to the main scanning direction, and a maximum cross-section area $S_{MAX}$ (mm$^2$) of all the cross-section areas S (see FIG. 2C):

$$S_{MAX}/S_{MIN} \leq 1.6 \qquad \text{Expression (2)}$$

(C) The cylindrical lens 64 preferably satisfies the following expression (3) defining a relationship between the minimum cross-section area $S_{MIN}$ (mm$^2$) of the respective cross-section areas S taken along the respective planes perpendicular to the main scanning direction A, and a dimension L (mm) of the effective lens portion 64c in the same direction (see FIGS. 2A and 2C):

$$L/S_{MIN} \geq 4 \qquad \text{Expression (3)}$$

(D) The cylindrical lens 64 preferably satisfies the following expression (4) defining a relationship between the maximum dimension $H_{MAX}$ (mm) in the sub-scanning direction B and a maximum dimension $HB_{MAX}$ (mm) of the effective lens portion 64c in the same direction (see FIG. 2C):

$$HB_{MAX} < H_{MAX} \leq 3HB_{MAX} \qquad \text{Expression (4)}$$

(E) The cylindrical lens 64 preferably satisfies the following expression (5) defining a relationship between the maximum dimension $HB_{MAX}$ (mm) of the effective lens portion 64c in the sub-scanning direction B and a diameter $\phi$ (mm) of the laser beam transmitted through the effective lens portion 64c (see FIG. 2C):

$$\phi + 1.5 < HB_{MAX} \leq 3(\phi + 1.5) \qquad \text{Expression (5)}$$

<Construction of Other Elements of Scanning Unit 50>

As shown in FIG. 1, the reflect mirror 65 is located above the develop roller 27 of the processing unit 18, and reflects the laser beam transmitted through the cylindrical lens 64, toward the outer surface of the photosensitive drum 23.

The box-like case 51 includes the bottom wall 52 that is fixed to the housing 2 with, e.g., screws, and a lid member 53 that covers an upper opening of the case 51. The case 51 has a such a shape that can incorporate the above-described laser emitter, not shown, the polygon-mirror drive motor 60, the polygon mirror 61, the fθ lens 62, the cylindrical lens 64, the return mirror 63, and the reflect mirror 65.

The scanning unit 50 constructed as described above scans, when a printing operation is carried out, the outer surface of the photosensitive drum 23 with a laser beam representing image data. More specifically described, first, the laser emitter emits, based on the image data, the laser beam toward the mirror-finished surfaces of the polygon mirror 61. This laser beam is reflected toward the return mirror 63, while being continuously deflected in the main scanning direction A by each of the mirror-finished surfaces of the polygon mirror 61 that is being rotated by the drive motor 60. Subsequently, the deflection of the laser beam is converted into uniform-speed deflection by the fθ lens 62, before being reflected by the return mirror 63 toward the reflect mirror 65. After the tilt of this laser beam is corrected in the sub-scanning direction by the cylindrical lens 64, the laser beam is reflected by the reflect mirror 65 toward the photosensitive drum 23, so as to scan the outer surface of the drum 23 at a high speed in the main scanning direction.

Since the other elements of the laser printer 1 have respective constructions known in the art, detailed description of those elements is omitted.

The above-described laser printer 1 enjoys the following advantages (1) through (6):

(1) A conventional cylindrical lens has two rib portions respectively provided at two opposite ends of a proper lens portion thereof in a sub-scanning direction, and accordingly may suffer from a problem that the proper lens portion is distorted and/or warped by the tensile stresses produced by the provision of the rib portions. To avoid this problem, the conventional cylindrical lens needs to have a great dimension in the sub-scanning direction. In contrast, the cylindrical lens 64 employed by the laser printer 1 is characterized in that in each cross section of the lens 64 taken along each plane perpendicular to the main scanning direction, the respective incidence surfaces (i.e., respective incidence-side edge lines) 64a of the two ineffective lens portions 64d, 64e do not project from the incidence surface (i.e., incidence-side edge line) 64a of the effective lens portion 64c, because the entire incidence surface 64a of the lens 64 is a plane surface, and the respective outgoing surfaces (i.e., respective outgoing-side edge lines) 64b of the two ineffective lens portions 64d, 64e do not project from the outgoing surface (i.e., outgoing-side edge line) 64b of the effective lens portion 64c, because the entire outgoing surface 64b is a convex, or outward curved, surface. Therefore, the cylindrical lens 64 need not have so great a dimension in the sub-scanning direction as that of the conventional one. Thus, the cylindrical lens 64 can enjoy a small sub-scanning-direction dimension H, without the distortion or warpage of the effective lens portion 64c thereof Since the cylindrical lens 64 can enjoy the small sub-scanning-direction dimension H because of being constructed as described above, the scanning unit 50 can also enjoy a small sub-scanning-direction dimension; and, since the scanning unit 50 can enjoy the small sub-scanning-direction dimension, the laser printer 1 incorporating the scanning unit 50 can enjoy a small height dimension.

(2) In addition, the cylindrical lens 64 employed by the laser printer 1 is so constructed as to have the relationship, represented by the above-indicated expression (2), between the minimum cross-section area $S_{MIN}$ (mm$^2$) of the cross-section areas S of the effective lens portion 64c, taken along the planes perpendicular to the main scanning direction A, and the maximum cross-section area $S_{MAX}$ (mm$^2$) of all those cross-section areas S. Thus, the change of cross-section area S of the effective lens portion 64c in the main scanning direction A is small. Therefore, a resin material that is cast into dies to mold the cylindrical lens 64 moves at a substantially uniform speed to each portion of an inner space of the dies. Thus, the quality of the cylindrical lens 64 as a molded product can be improved.

(3) Moreover, the cylindrical lens 64 is so constructed as to have the relationship, represented by the above-indicated expression (3), between the minimum cross-section area $S_{MIN}$ (mm$^2$) of the cross-section areas S of the effective lens portion 64c, taken along the planes perpendicular to the main scanning direction A, and the dimension L (mm) of the effective lens portion 64c in the same direction. Thus, the sub-scanning-direction dimension H of the cylindrical lens 64 can be further decreased.

(4) In addition, the cylindrical lens 64 is so constructed as to have the relationship, represented by the above-indicated expression (4), between the maximum dimension $H_{MAX}$ (mm) in the sub-scanning direction B and the maximum dimension $HB_{MAX}$ (mm) of the effective lens portion 64c in the same direction. That is, the sub-scanning-direction dimension of each of the two ineffective lens portions 64d, 64e is equal to, or smaller than, that of the effective lens portion 64c Thus, the sub-scanning-direction dimension of each ineffective lens portion 64d, 64e can be prevented from being unnecessarily increased, and accordingly the sub-scanning-direction dimension H of the cylindrical lens 64 can be further decreased.

(5) In addition, the cylindrical lens 64 is so constructed as to have the relationship, represented by the above-indicated expression (5), between the maximum dimension $HB_{MAX}$ (mm) of the effective lens portion 64c in the sub-scanning direction B and the diameter φ (mm) of the laser beam transmitted through the effective lens portion 64c. Thus, the sub-scanning-direction dimension HB of the effective lens portion 64c can be decreased so as not to lower the quality of printed images and accordingly the sub-scanning-direction dimension H of the cylindrical lens 64 can be decreased as such.

(6) In addition, the cylindrical lens 64 employed by the laser printer 1 has the two positioning projections 64g in the two opposite end portions thereof in the main scanning direction A. Therefore, when the cylindrical lens 64 is formed by molding, the effective lens portion 64c is little influenced by the tensile stresses produced by the cooling of the projections 64g. Thus, the incidence and outgoing surfaces 64a, 64b of the cylindrical lens 64 can be freed of distortion or warpage.

Next, there will be described second through eighth embodiments of the present invention, by reference to FIGS. 3A, 3B, 3C, 4A, 4B, 4C, 4D, 4E, 4F, 4G, 4H, 5A, and 5B, when needed.

In the first embodiment shown in FIGS. 2A, 2B, and 2C, the cylindrical lens 64 is formed of the resin having the low degree of hygroscopicity, such as non-crystalline or crystalline olefinic resin. However, the cylindrical lens 64 may be form of a different material. For example, the cylindrical lens 64 may be formed of a resin having a high degree of hygroscopicity, such as PMMA (polymethylmethacrylate) resin; a copolymer containing acrylate or its derivative; a mixture containing a polymer of acrylate or its derivative; MS (methyl-methacrylate styrene) resin; a copolymer containing aromatic carbonate or its derivative; a mixture containing a polymer of aromatic carbonate or its derivative; a copolymer of aromatic carbonate or its derivative and styrene or its derivative; and a mixture of a polymer of aromatic carbonate or its derivative and a polymer of styrene or its derivative.

The cylindrical lens 64 preferably satisfies the following expression (6) defining a relationship between the maximum dimension $D_{MAX}$ (mm) in the optical-axis direction C, the maximum dimension $H_{MAX}$ (mm) in the sub-scanning direction B, and the maximum dimension $HB_{MAX}$ (mm) of the effective lens portion 64c in the sub-scanning direction B:

$$H_{MAX} - HB_{MAX} > D_{MAX} \qquad \text{Expression (6)}$$

Expression (6) means that a distance $[(H_{MAX} - HB_{MAX})/2]$ between each end surface of the cylindrical lens 64 in the sub-scanning direction B, and the effective lens portion 64c is greater than a distance ($D_{MAX}/2$) between each end surface 64a, 64b of the lens 64 in the optical-axis direction C, and the center of the effective lens portion 64c. Therefore, a longer time is needed for water to permeate via each sub-scanning-direction end (i.e., incidence or outgoing) surface of the lens 64 to the effective lens portion 64c, than that needed for water to permeate via the incidence or outgoing surface 64a, 64b to the effective lens portion 64c. Thus, the distribution of refractive index of the effective lens portion 64c can be prevented from being complicated by the permeation of water into the portion 64c via a plurality of routes.

The cylindrical lens 64 is so constructed as to have the relationship, represented by the above-indicated expression (2), between the minimum cross-section area $S_{MIN}$ (mm$^2$) of the cross-section areas S of the effective lens portion 64c, taken along the planes perpendicular to the main scanning direction A, and the maximum cross-section area $S_{MAX}$ (mm$^2$) of all those cross-section areas S. However, the cylindrical lens 64 may be constructed in a different manner, so long as the change of cross-section area of the effective lens portion 64c is sufficiently small. More specifically described, as exemplified in an eighth embodiment shown in FIGS. 5A and 5B, a cylindrical lens 164 is constructed such that either one of (a) an optical-axis-direction dimension $D_Y$ (mm) of a cross section thereof that is taken along a plane perpendicular to the main scanning direction A and is distant by a distance Y (mm) from one end surface 164e thereof in the same direction and (b) a sub-scanning-direction dimension $H_Y$ (mm) of that cross section increases as the distance Y increases, and the other of the two dimensions decreases as the distance Y increases.

In the eighth embodiment, at least one of two opposite end surfaces 164c, 164d of the cylindrical lens 164 in the sub-scanning direction B may be defined by a curved surface. A distance $H_Y$ between the two opposite end surfaces 164c, 164d may be continuously increased or decreased as the distance Y increases, as shown in FIG. 5B. Alternatively, at least one of the two opposite end surfaces 164c, 164d of the cylindrical lens 164 may be defined by a stepped surface, so that the distance $H_Y$ between the two opposite end surfaces 164c, 164d may be stepwise increased or decreased as the distance Y increases. Moreover, at least one of the two opposite end surfaces 164c, 164d of the cylindrical lens 164 may have a shape defined by a combination of a plurality of plane surfaces.

Since the change of cross-section area of the cylindrical lens 164 in the main scanning direction A is sufficiently small, a resin material that is cast into dies to mold the cylindrical lens 164 moves at a substantially uniform speed to each portion of an inner space of the dies. Thus, the quality of the cylindrical lens 164 as a molded product can be improved.

The cylindrical lens 164 may be constructed such that a rate of change of respective cross-section areas $S_Y$ (mm$^2$) that are taken along respective planes perpendicular to the main scanning direction A and are distant by the distance Y from the one end surface 164e thereof in the same direction, satisfies the following expression (7):

$$-0.2 \leq (dS_Y/dy) \leq 0.2 \qquad \text{Expression (7)}$$

Since the change of cross-section areas $S_Y$ of the cylindrical lens 164 in the main scanning direction A is sufficiently small, a resin material that is cast into dies to mold the cylindrical lens 164 moves at a substantially uniform speed to each portion of an inner space of the dies. Thus, the quality of the cylindrical lens 164 as a molded product can be improved.

The cylindrical lens 64 is constructed such that in each cross section of the lens 64 taken along each plane perpendicular to the main scanning direction, the incidence surface (i.e., incidence-side edge line) 64a of each of the first and second ineffective lens portions 64d, 64e does not project from the incidence surface (ie., incidence-side edge line) 64a of the effective lens portion 64c, and the outgoing surface (i.e., outgoing-side edge line) 64b of each of the first and second ineffective lens portions 64d, 64e does not project from the outgoing surface (i.e., outgoing-side edge line) 64b of the effective lens portion 64c. However, the cylindrical lens 64 may be constructed in a different manner. The cylindrical lens 64 may be constructed such that in each cross section of the lens 64 taken along each plane perpendicular to the main scanning direction, the incidence and outgoing surfaces (i.e., incidence-side and outgoing-side edge lines) 64a, 64b of one of the first and second ineffective lens portions 64d, 64e do not project from the incidence and outgoing surface (i.e., incidence-side and outgoing-side edge lines) 64a, 64b of the effective lens portion 64c, respectively. In the latter embodiment, however, the other ineffective lens portion 64d or 64e whose incidence and outgoing surfaces 64a, 64b project from the incidence and outgoing surfaces 64a, 64b of the effective lens portion 64c, respectively, needs to have an increased sub-scanning-direction dimension assuring that the other ineffective lens portion does not cause distortion or warpage of the effective lens portion 64c. In this embodiment, since the incidence and outgoing surfaces 64a, 64b of the one ineffective lens portion 64d or 64e do not project from the incidence and outgoing surface 64a, 64b of the effective lens portion 64c, respectively, the sub-scanning-direction dimension of the cylindrical lens 64 can be decreased as such.

Figure 3A:
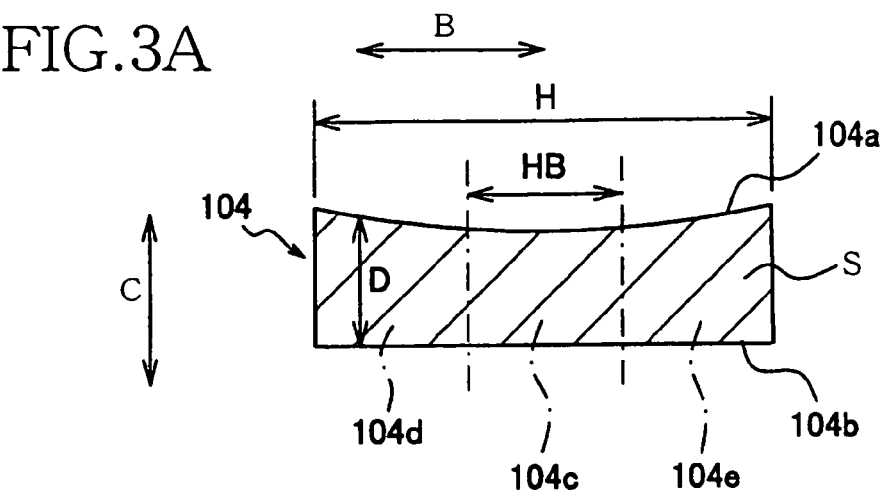
FIG. 3A is an enlarged cross-section view corresponding to FIG. 2C, showing another cylindrical lens as a second embodiment of the present invention.

The cylindrical lens 64 is constructed such that in each cross section of the lens 64 taken along each plane perpendicular to the main scanning direction, the entire incidence surface 64a of the lens is straight, and the entire outgoing surface 64b of the lens 64 is curved outward, or convex. However, the cylindrical lens 64 may be constructed in a different manner. For example, as shown in FIG. 3A, the present invention may be embodied by a cylindrical lens 104 as a second embodiment that is constructed such that in each cross section of the lens 104 taken along each plane perpendicular to the main scanning direction A, an entire incidence surface 104a of the lens 104 is curved inward, or concave, and an entire outgoing surface 104b of the lens 104 is straight. Here, it is noted that dimensions H (mm), HB (mm), D (mm) used in FIG. 3A have the same definitions as those of the corresponding dimensions H (mm), HB (mm), D (mm) used in FIG. 2C. In addition, the present invention may be embodied by a so-called "cylindrical" lens, not shown, that is constructed such that in each cross section of the lens taken along each plane perpendicular to the main scanning direction A, each of entire incidence and outgoing surfaces of the lens is curved outward, or convex. Moreover, the present invention may be embodied by a cylindrical lens, not shown, that is constructed such that in each cross section of the lens taken along each plane perpendicular to the main scanning direction A, each of entire incidence and outgoing surfaces of the lens is curved inward, or concave; and the present invention may be embodied by a cylindrical lens, not shown, that is constructed such that in each cross section of the lens taken along each plane perpendicular to the main scanning direction A, one of entire incidence and outgoing surfaces of the lens is curved outward or convex and the other surface of the lens is curved inward or concave.

In particular, in the case where the cylindrical lens 104 is constructed, as shown in FIG. 3A, such that the entire incidence surface 104a of the lens 104 is curved inward or concave, the lens 104 may have the following structural features: In each cross section of the lens 104 taken along each plane perpendicular to the main scanning direction A, the concave incidence surface 104a of an effective lens portion 104c is represented by a central curved line defined by a single mathematical function, and the incidence surface 104a of each of two ineffective lens portions 104d, 104e does not project outward, in the optical-axis direction, from a side curved line extended from the central curved line according to the same mathematical function. This mathematical function defines the central curved line and the two side curved lines, as an edge line of each cross section of the cylindrical lens 104 taken along each plane (i.e., an X-Z plane) perpendicular to the main scanning direction A (ie., a Y axis), in an X-Y-Z coordinate space defined by an X axis (i.e, the sub-scanning direction B), the Y axis and a Z axis (i.e. the optical-axis direction C). For example, the mathematical function is defined by the following expression: $x^2+Z^2=r^2$, where r is a constant. In this case, too, the cylindrical lens 104 enjoys the same advantages as those of the cylindrical lens 64.

However, the cylindrical lens 104 may be modified such that in each cross section of the modified lens taken along each plane perpendicular to the main scanning direction A, the incidence surface 104a of one of the two ineffective lens portions 104d, 104e does not project outward from the corresponding side curved line extended from the central curved line according to the mathematical function, and the incidence surface 104a of the other ineffective lens portions 104d or 104e projects outward from the corresponding side curved line. In this modified embodiment, however, the other ineffective lens portion 104d or 104e whose incidence surfaces 104a projects from the incidence surface 104a of the effective lens portion 104c needs to have an increased sub-scanning-direction dimension assuring that the other ineffective lens portion does not cause distortion or warpage of the effective lens portion 104c. In this modified embodiment, too, the modified cylindrical lens enjoys the same advantages as those of the cylindrical lens 104 shown in FIG. 3A.

Figure 3B:
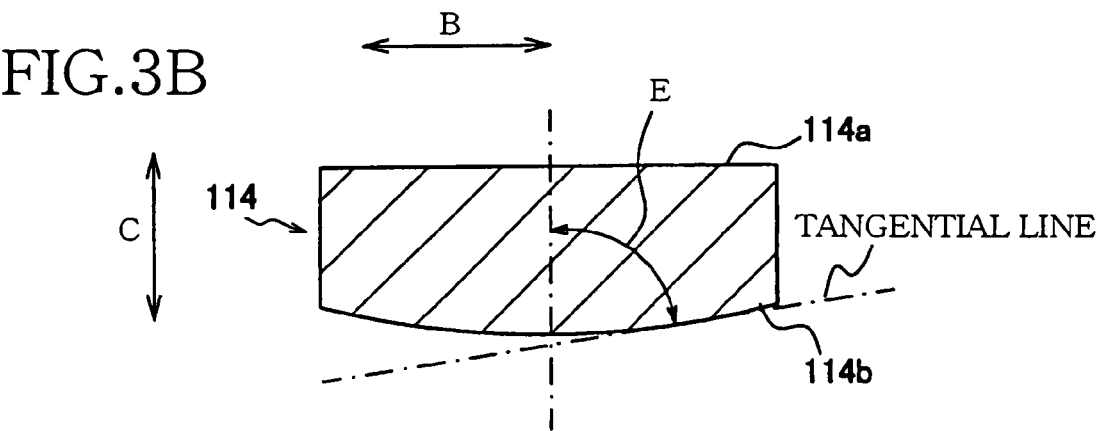
FIG. 3B is an enlarged cross-section view corresponding to FIG. 2C, showing another cylindrical lens as a third embodiment of the present invention.

In addition, the present invention may be embodied by a cylindrical lens 114 as a third embodiment that is constructed, as shown in FIG. 3B, such that an entire outgoing surface 114b of the lens 114 is curved outward, the lens 114 may have the following structural features: In each cross section of the cylindrical lens 114 taken along each plane perpendicular to the main scanning direction A, each of incidence and outgoing surfaces 114b, 114c of the lens 114 is represented by a curved line, and an angle contained by the optical-axis direction C and a tangential line passing through an arbitrary point on the curved line ranges from 80 degrees, inclusive, to 110 degrees, inclusive. In this embodiment, too, the cylindrical lens 114 enjoys the same advantages as those of the cylindrical lens 64.

However, the cylindrical lens 114 may be modified such that in each cross section of the modified lens taken along each plane perpendicular to the main scanning direction A, an entire incident surface 114a of the modified lens is curved outward or convex. In this case, the modified cylindrical lens may have similar structural features to those of the cylindrical lens 114 shown in FIG. 3B. Thus, the modified cylindrical lens enjoys the same advantages as those of the cylindrical lens 114.

Figure 3C:
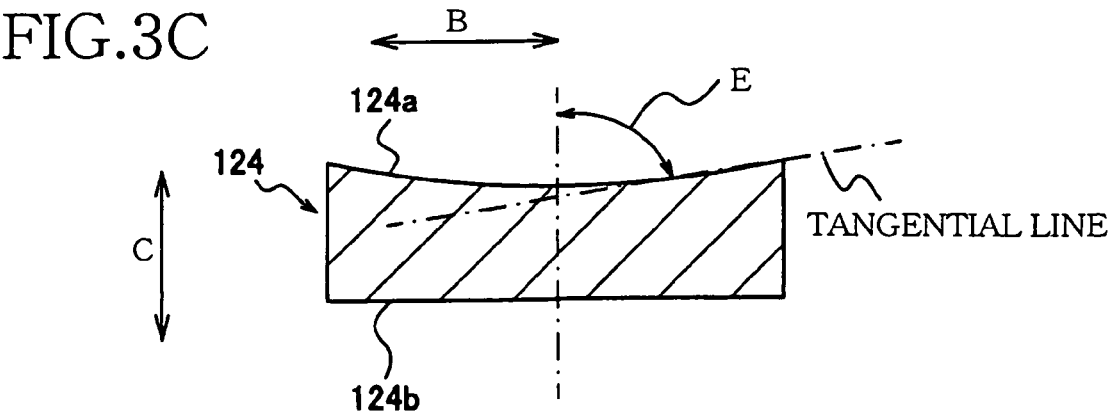
FIG. 3C is an enlarged cross-section view corresponding to FIG. 2C, showing another cylindrical lens as a fourth embodiment of the present invention.
Figure 6A:
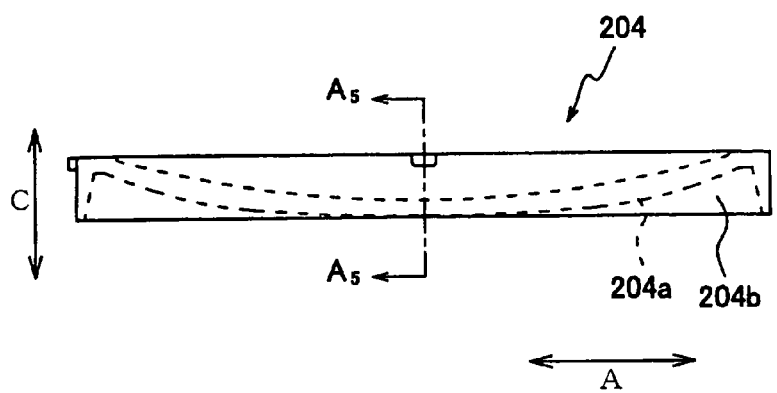
FIG. 6A is a plan view corresponding to FIG. 2A, showing a conventional cylindrical lens.
Figure 6B:
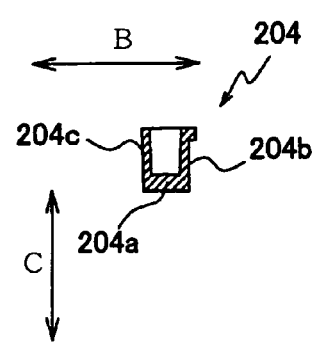
FIG. 6B is a cross-section view of the conventional cylindrical lens of FIG. 6A, taken along a plane indicated by arrows A5, A5 in FIG. 6A.

In addition, the present invention may be embodied by a cylindrical lens 124 as a fourth embodiment that is constructed, as shown in FIG. 3C, such that an entire incident surface 124a of the lens 124 is inwardly curved, or concave, the lens 124 may have the following structural features: In each cross section of the cylindrical lens 124 taken along each plane perpendicular to the main scanning direction A, the incident surface 124a of the lens 124 is represented by a curved line, and an angle contained by the optical-axis direction C and a tangential line passing through an arbitrary point on the curved line ranges from 80 degrees, inclusive, to 110 degrees, inclusive. In this embodiment, too, the cylindrical lens 124 enjoys the same advantages as those of the cylindrical lens 64.

However, the cylindrical lens 124 may be modified such that in each cross section of the modified lens taken along each plane perpendicular to the main scanning direction A, an entire outgoing surface 124b of the modified lens is inwardly curved, or concave. In this case, the modified cylindrical lens may have similar structural features to those of the cylindrical lens 124 shown in FIG. 3C. Thus, the modified cylindrical lens enjoys the same advantages as those of the cylindrical lens 124.

The cylindrical lens 64, shown in FIG. 2A, has the two positioning projections 64g at the two opposite ends thereof in the main scanning direction A. However, the cylindrical lens 64 may be constructed in a different manner. For example, as shown in FIGS. 4A and 4B, the present invention may be embodied by a cylindrical lens 134 as a fifth embodiment that has, in addition to two positioning projections 64g provided at two opposite ends thereof in the main scanning direction A, a positioning projection 135 provided on a substantially central portion of one of two opposite end surfaces thereof that are opposite to each other in the sub-scanning direction B. The positioning projection 135 is elongate in the sub-scanning direction B. In this embodiment, for example, when the cylindrical lens 134 is attached to the scanning unit 50 of the laser printer 1 shown in FIG. 1, the positioning projection 135 may be engaged with an appropriate portion of the box-like case 51 of the unit 50, so as to prevent the movement of the lens 134 in the main scanning direction A. Thus, the positioning projection 135 is used to position the lens 134 in at least the main scanning direction A.

In addition, as shown in FIGS. 4D and 4E, the present invention may be embodied by a cylindrical lens 144 as a sixth embodiment that has, in addition to two positioning projections 64g provided at two opposite ends thereof in the main scanning direction A, a positioning projection 145 provided on a substantially central portion of one of two opposite end surfaces thereof that are opposite to each other in the sub-scanning direction B. The positioning projection 145 is elongate in the main scanning direction A. In this embodiment, for example, when the cylindrical lens 144 is attached to the scanning unit 50 of the laser printer 1 shown in FIG. 1, the positioning projection 145 may be engaged with an appropriate portion of the box-like case 51 of the unit 50, so as to prevent the movement of the lens 144 in the main scanning direction A. Thus, the positioning projection 145 is used to position the lens 144 in at least the main scanning direction A.

As shown in FIG. 4C, the positioning projection 135 of the cylindrical lens 134 has an optical-axis-direction dimension RD (mm) that is smaller than the maximum optical-axis-direction dimension $D_{MAX}$ (mm) of the lens 134. Preferably, the optical-axis-direction dimension RD (mm) of the positioning projection 135 ranges from 2.5 mm to 3.5 mm. In this case, when the cylindrical lens 134 is formed by molding, the positioning projection 135 can be cooled substantially simultaneously with the remaining portions of the lens 134, and incidence and outgoing surfaces 64a, 64b of the lens 134 can be freed of distortion or warpage.

In addition, the positioning projection 135 of the cylindrical lens 134 has a main-scanning-direction dimension RL (mm) that is smaller than a main-scanning-direction dimension L (mm) of an effective lens portion of the lens 134. Preferably, the main-scanning-direction dimension RL (mm) of the positioning projection 135 ranges from 0.5 mm to 1.5 mm. In this case, when the cylindrical lens 134 is formed by molding, the positioning projection 135 can be cooled more appropriately with the remaining portions of the lens 134.

As shown in FIG. 4F, the positioning projection 145 of the cylindrical lens 144 has an optical-axis-direction dimension RD (mm) that is smaller than the maximum optical-axis-direction dimension $D_{MAX}$ (mm) of the lens 144. Preferably, the optical-axis-direction dimension RD (mm) of the positioning projection 145 ranges from 0.5 mm to 1.5 mm.

In addition, preferably, the optical-axis-direction dimension RD (mm) of the positioning projection 145 of the cylindrical lens 144, and a maximum sub-scanning-direction dimension $H_{MAX}$ (mm) of the lens 144 satisfies the following expression (8):

$$RD \leq H_{MAX}/3 \qquad \text{Expression (8)}$$

In addition, preferably, the optical-axis-direction dimension RD (mm) of the positioning projection 145, the maximum sub-scanning-direction dimension $H_{MAX}$ (mm) of the cylindrical lens 144, and a maximum sub-scanning-direction dimension $HB_{MAX}$ (mm) of an effective lens portion of the lens 144 satisfies the following expression (9):

$$RD \leq (H_{MAX} - HB_{MAX})/2 \qquad \text{Expression (9)}$$

In addition, the positioning projection 145 of the cylindrical lens 144 has a main-scanning-direction dimension RL (mm) that is smaller than a main-scanning-direction dimension L (mm) of the effective lens portion of the lens 144. Preferably, the main-scanning-direction dimension RL (mm) of the positioning projection 145 ranges from 2.5 mm to 5 mm. In this case, when the cylindrical lens 144 is formed by molding, the positioning projection 145 can be cooled substantially simultaneously with the remaining portions of the lens 144, and incidence and outgoing surfaces 64a, 64b of the lens 144 can be freed of distortion or warpage.

FIGS. 4G and 4H show a cylindrical lens 154 as a seventh embodiment of the present invention. The cylindrical lens 154 has, in two opposite end portions thereof that are opposite to each other in the main scanning direction A, two extended portions 155, respectively, whose free end portions are located outside the outermost portion of an effective lens portion of the lens 154 in the optical-axis direction C. Thus, for example, when the cylindrical lens 154 is placed on a working table, the respective free ends of the two extended portions 155 of the lens 154 are contacted with the table, and accordingly incidence and outgoing surfaces 64a, 64b of an effective lens portion of the lens 154 are not contacted with the same. Thus, the surfaces of the effective lens portion can be prevented from being contaminated with, e.g., grease remaining on the table.

In the embodiment shown in FIGS. 2A, 2B, and 2C, the cylindrical lens 64 includes the two ineffective lens portions 64d, 64e that are located on either side of the effective lens portion 64c in the sub-scanning direction B, and in the cross section of the cylindrical lens 64, shown in FIG. 2C, each of the two ineffective lens portions 64d, 64e does not project outward from the outward curved surface 64f of the effective lens portion 64c in the optical-axis direction C. According to this feature, the sub-scanning-direction dimension H of the cylindrical lens 64 can be further decreased.

In the embodiment shown in FIG. 3A, the cylindrical lens 104 includes the two ineffective lens portions 104d, 104e that are located on either side of the effective lens portion 104c in the sub-scanning direction B, and in the cross section of the cylindrical lens 104, shown in FIG. 3A, each of the two ineffective lens portions 104d, 104e does not project outward from the outward curved surface 104f of the effective lens portion 104c in the optical-axis direction C. According to this feature, the sub-scanning-direction dimension H of the cylindrical lens 104 can be further decreased.

In each of the embodiments shown in FIGS. 2A, 2B, 2C, and 3A, the minimum value $S_{MIN}$ (mm²) of the cross-section area S of the effective lens portion 64c, 104c, taken along the plane perpendicular to the main scanning direction A, and the maximum value $S_{MAX}$ (mm²) of the cross-section area S of the effective lens portion 64c, 104c satisfies the above-indicated expression (2). According to this feature, when a resin material is cast in, e.g., molding dies to form the cylindrical lens 64, 104, the resin material can move at a substantially uniform speed to each portion of an inner space of the dies. More specifically described, the change of cross-section area S of the effective lens portion 64c, 104c in the main scanning direction A is small and accordingly the resin material cast in the molding dies can move at the substantially uniform speed to each portion of the inner space of the dies. Thus, the quality of the cylindrical lens 64, 104 as the molding product can be improved.

In the embodiment shown in FIGS. 5A and 5B, one of (a) the dimension $D_Y$ (mm) in the optical-axis direction C of the cross section of the cylindrical lens 164 that is taken along the plane perpendicular to the main scanning direction A and is distant by the distance Y (mm) from one 164e of the opposite end surfaces of the cylindrical lens 164 in the main scanning direction A, and (b) the dimension $H_Y$ (mm) in the sub-scanning direction B of the cross section of the cylindrical lens 164 increases, and the other of (a) the dimension $D_Y$ and (b) the dimension $H_Y$ decreases, as the distance Y increases. According to this feature, the change of cross-section area of the cylindrical lens 164 in the main scanning direction A is made small in a different manner than the manner described above in connection with the embodiments shown in FIGS. 2A–2C, 3A–3C, and 4A–4H, and accordingly the resin material cast in the molding dies can move at the substantially uniform speed to each portion of the inner space of the dies. Thus, the quality of the cylindrical lens 164 as the molding product can be improved.

In each of the embodiments shown in FIGS. 2A–2C and 3A, the maximum dimension $D_{MAX}$ (mm) of the cylindrical lens 64, 104 in the optical-axis direction C, the maximum dimension $H_{MAX}$ (mm) of the cylindrical lens in the sub-scanning direction B, and the maximum dimension $HB_{MAX}$ (mm) of the effective lens portion 64c, 104c in the same direction B satisfies the above-indicated expression (3). The cylindrical lens 64, 104 may be formed of a resin having a low degree of hygroscopicity or a resin having a high degree of hygroscopicity. In the case where the cylindrical lens 64, 104 is formed of the resin having the high degree of hygroscopicity, moisture easily permeates the lens through the two opposite end surfaces 64a, 64b, 104a, 104b of the effective lens portion 64c, 104c that are opposite to each other in the optical-axis direction C, and/or the two opposite end surfaces of the lens that are opposite to each other in the sub-scanning direction B, so that the refractive index of the effective lens portion 64c, 104c may be changed. In particular, when moisture permeates the cylindrical lens 64, 104 in a plurality of directions, for example, through not only the optical-axis-direction opposite end surfaces of the effective lens portion but also the sub-scanning-direction opposite end surfaces of the cylindrical lens, the distribution of refractive index of the effective lens portion is complicated, so that the laser beam transmitted through the effective lens portion is not uniformly refracted by the same. Thus, the laser beam cannot accurately scan the photosensitive drum 23, thereby lowering the quality of images formed on the drum 23. According to this feature, the distance, $(H_{MAX}-HB_{MAX})/2$, between each of the sub-scanning-direction opposite end surfaces of the cylindrical lens 64, 104 and the effective lens portion 64c, 104c is greater than the distance, $D_{MAX}/2$, between each of the optical-axis-direction opposite end surfaces 64a, 64b, 104a, 104b of the cylindrical lens and the center of the effective lens portion, and accordingly a time needed for moisture to permeate the cylindrical lens from each of the sub-scanning-direction opposite end surfaces of the cylindrical lens to the effective lens portion is longer than a time needed for moisture to permeate the lens from each of the optical-axis-direction opposite end surfaces of the cylindrical lens to the effective lens portion. Thus, the effective lens portion can be prevented from being permeated by moisture in the plurality of directions or being complicated with respect to the distribution of refractive index thereof.

In each of the embodiments shown in FIGS. 2A–2C and 3A, the maximum dimension $H_{MAX}$ (mm) of the cylindrical lens 64, 104 in the sub-scanning direction B and the maximum dimension $HB_{MAX}$ (mm) of the effective lens portion 64c, 104c in the same direction B satisfies the above-indicated expression (4). According to this feature, the sub-scanning-direction dimension of each of the ineffective lens portions 64d, 64e, 104d, 104e can be prevented from being unnecessarily increased, and accordingly the sub-scanning-direction dimension of the cylindrical lens 64, 104 can be decreased.

In each of the embodiments shown in FIGS. 2A–2C and 3A, the maximum dimension $HB_{MAX}$ (mm) of the effective lens portion 64c, 104c in the sub-scanning direction B and the diameter $\phi$ (mm) of the laser beam transmitted through the effective lens portion satisfies the above-indicated expression (5). According to this feature, the sub-scanning-direction dimension of each of the ineffective lens portions 64d, 64e, 104d, 104e can be prevented from being unnecessarily increased, and accordingly the sub-scanning-direction dimension of the cylindrical lens 64, 104 can be decreased.

In each of the embodiments shown in FIGS. 2A–2C, 3A–3C, and 4A–4H, the cylindrical lens 64, 104, 114, 124, 134, 144, 154 includes the two positioning projections 64g which positions the cylindrical lens in the optical-axis direction C; and in each of the embodiments shown in FIGS. 4A–4F, the cylindrical lens 134, 144 includes one positioning projection 135, 145 that positions the cylindrical lens in the main scanning direction A. Thus, for example, when the cylindrical lens is attached to the scanning unit 50, it is needed to prevent the movement of the lens relative to the scanning unit 50 in not only the main scanning direction A but also the optical-axis direction C, for the purpose of assuring that the laser beam transmitted through the lens accurately scans the photosensitive drum. According to this feature, for example, when the cylindrical lens is attached to the box-like case 51 of the scanning unit 50, the positioning projection 64g, 135, 145 of the lens can be engaged with an appropriate portion of the box-like case 51, so as to prevent the movement of the lens in the main scanning direction A and/or the optical-axis direction C and thereby position the lens in the same direction(s).

In each of the embodiments shown in FIGS. 4A–4F, the positioning projection 135, 145 projects outward from one of the two opposite end surfaces of the cylindrical lens 134, 144 in the sub-scanning direction B, and the dimension RD (mm) of the positioning projection 135, 145 in the optical-axis direction C is smaller than the maximum dimension $D_{MAX}$ (mm) of the cylindrical lens in the optical-axis direction C. According to this feature, the dimension (i.e., the thickness) of the positioning projection 135, 145 in the optical-axis direction C is smaller than the dimension (i.e., the thickness) of the cylindrical lens 134, 144 in the same direction C. Therefore, when the cylindrical lens is formed by molding, the positioning projection 135, 145 can be cooled substantially simultaneously with the other portions of the lens than the projection. Thus, the incidence and outgoing surfaces 64a, 64b of the cylindrical lens 134, 144 can be prevented from being distorted or warped.

In each of the embodiments shown in FIGS. 4A–4F, the positioning projection 135, 145 projects outward from one of the two opposite end surfaces of the cylindrical lens 134, 144 in the sub-scanning direction B, and the dimension RL (mm) of the positioning projection in the main scanning direction A is smaller than the dimension L (mm) of the effective lens portion of the lens in the same direction A. According to this feature, the dimension (i.e., the width) of the positioning projection 135, 145 in the main scanning direction A is smaller than the dimension (i.e., the width) of the effective lens portion in the same direction A. Therefore, when the cylindrical lens 134, 144 is formed by molding, the positioning projection 135, 145 can be cooled substantially simultaneously with the other portions of the lens than the projection. Thus, the incidence and outgoing surfaces 64a, 64b of the cylindrical lens 134, 144 can be prevented from being distorted or warped.

In each of the embodiments shown in FIGS. 2A–2C, 3A–3C, and 4A–4H, the cylindrical lens 64, 104, 114, 124, 134, 144 includes the two ineffective lens portions 64h that are located on either side of the effective lens portion 64c, 104c in the main scanning direction A and that has no possibility that the laser beam is transmitted therethrough. The two positioning projections 64g project outward from the two ineffective lens portions 64h in the main scanning direction A. According to this feature, when the cylindrical lens is formed by molding, the effective lens portion 64c, 104c is little influenced by the tensile forces produced by the cooling of the positioning projections 64g. Thus, the incidence and outgoing surfaces 64a, 64b, 104a, 104b, 114a, 114b, 124a, 124b of the cylindrical lens can be prevented from being distorted or warped.

In each of the embodiment shown in FIGS. 4G and 4H, the cylindrical lens 154 includes the two extended portions 155 that are extended, in the optical-axis line, from the two opposite end portions 64g of the cylindrical lens 154, respectively, that are opposite to each other in the main scanning direction A, and the respective free end portions of the two extended portions 155 are located outside the outermost portion of the effective lens portion in the optical-axis direction C. For example, when the scanning unit 50 is assembled, the cylindrical lens 154 may be placed on a working table, and the incidence and/or outgoing surfaces 64a, 64b of the effective lens portion thereof may be contacted with the working table, so that the surfaces of the effective lens portion may be contaminated with grease remaining on the table. According to this feature, when the cylindrical lens 154 is placed on the working table, the respective free ends of the two extended portions 155 of the lens are contacted with the table, and accordingly the incidence and/or outgoing surfaces 64a, 64b of the effective lens portion are not contacted with the same. Thus, the surfaces of the effective lens portion can be prevented from being contaminated with, e.g., grease remaining on the table.

It is to be understood that the present invention may be embodied with other changes and improvements that may occur to a person skilled in the art, without departing from the spirit and scope of the invention defined in the claims.

What is claimed is:

1. An optical lens system, comprising:
   a plurality of optical lenses which cooperate with each other to transmit a laser beam deflected in a main scanning direction to scan an object in the main scanning direction, and which include a first lens which is formed of a resin and has a tilt correction function, and at least one second lens which is remoter from the object than the first lens on an optical path,
   the first lens, including:
   an effective lens portion which transmits the laser beam therethrough, the effective lens portion having an incidence surface to which the laser beam is incident in an optical-axis direction, and an outgoing surface from which the laser beam outgoes in the optical-axis direction, and at least one of the incidence surface and the outgoing surface being curved outward such that in a cross section of the first lens taken along a plane perpendicular to the main scanning direction, two opposite edge lines of the effective lens portion that are opposite to each other in the optical-axis direction and correspond to the incidence surface and the outgoing surface, respectively, include at least one outward curved line that is curved outward in the optical-axis direction, and at least one first ineffective lens portion, which does not transmit the laser beam therethrough, and which is located adjacent the effective lens portion in a sub-scanning direction perpendicular to the main scanning direction and the optical-axis direction, wherein in the cross section of the first lens, said at least one first ineffective lens portion does not project outward from the outward curved surface of the effective lens portion in the optical-axis direction.

2. The optical lens system according to claim 1, wherein the first lens includes two said first ineffective lens portions which are located on either side of the effective lens portion in the sub-scanning direction, and in the cross section of the first lens, each of the two first ineffective lens portions does not project outward from the outward curved surface of the effective lens portion in the optical-axis direction.

3. An optical lens system, comprising:
a plurality of optical lenses which cooperate with each other to transmit a laser beam deflected in a main scanning direction to scan an object in the main scanning direction, and which include a first lens which is formed of a resin and has a tilt correction function, and at least one second lens which is remoter from the object than the first lens on an optical path,
the first lens, including:
an effective lens portion which transmits the laser beam therethrough, the effective lens portion having an incidence surface to which the laser beam is incident in an optical-axis direction, and an outgoing surface from which the laser beam outgoes in the optical-axis direction, at least one of the incidence surface and the outgoing surface being curved inward such that in a cross section of the first lens taken along a plane perpendicular to the main scanning direction, two opposite edge lines of the effective lens portion that are opposite to each other in the optical-axis direction and correspond to the incidence surface and the outgoing surface, respectively, include an inward curved line that is curved inward in the optical-axis direction, and being defined as a first curved line defined by a single mathematical function; and
at least one first ineffective lens portion which does not transmit the laser beam therethrough, and which is located adjacent the effective lens portion in a sub-scanning direction perpendicular to the main scanning direction and the optical-axis direction, wherein in the cross section of the first lens, said at least one first ineffective lens portion does not project outward, in the optical-axis direction, from at least one second curved line, which is extended from the first curved line according to the single mathematical function.

4. The optical lens system according to claim 3, wherein the first lens includes two said first ineffective lens portions which are located on either side of the effective lens portion in the sub-scanning direction, and in the cross section of the first lens, each of the two first ineffective lens portions does not project outward from a corresponding one of two said second curved lines which are extended from the first curved line in two opposite directions, respectively, according to the mathematical function.

5. An optical lens system, comprising:
a plurality of optical lenses which cooperate with each other to transmit a laser beam deflected in a main scanning direction to scan an object in the main scanning direction, and which include a first lens which is formed of a resin and has a tilt correction function, and at least one second lens which is remoter from the object than the first lens on an optical path,
wherein:
in a cross section of the first lens taken along a plane perpendicular to the main scanning direction, two opposite edge lines of the first lens that are opposite to each other in an optical-axis direction in which the laser beam is incident to the first lens, include at least one curved line, and
an angle of a tangential line passing through an arbitrary point on each of the two opposite edge lines, relative to the optical-axis direction, falls in a range of from 80 degrees, inclusive, to 100 degrees, inclusive.

6. The optical lens system according to claim 1, wherein a maximum dimension $D_{MAX}$ (mm) of the first lens in the optical-axis direction and a maximum dimension $H_{MAX}$ (mm) of the first lens in the sub-scanning direction satisfies a following expression:

$$H_{MAX} \leq 3 D_{MAX}$$

7. The cylindrical lens according to claim 1, wherein a minimum value $S_{MIN}$ (mm$^2$) of a cross-section area of the effective lens portion of the first lens taken along the plane perpendicular to the main scanning direction and a maximum value $S_{MAX}$ (mm$^2$) of the cross-section area of the effective lens portion satisfies a following expression:

$$S_{MAX}/S_{MIN} \leq 1.6$$

8. The optical lens system according to claim 1, wherein one of (a) a dimension $D_y$ (mm) in the optical-axis direction of a cross section of the first lens that is taken along the plane perpendicular to the main scanning direction and is distant by a distance Y (mm) from one of opposite ends of the first lens in the main scanning direction, and (b) a dimension $H_y$ (mm) in the sub-scanning direction of the cross section of the first lens increases, and an other of (a) the dimension $D_y$ and (b) the dimension $H_y$ decreases, as the distance Y increases.

9. The optical lens system according to claim 1, wherein a maximum dimension $D_{MAX}$ (mm) of the first lens in the optical-axis direction, a maximum dimension $H_{MAX}$ (mm) of the first lens in the sub-scanning direction, and a maximum dimension $HB_{MAX}$ (mm) of the effective lens portion of the first lens in the sub-scanning direction satisfies a following expression:

$$H_{MAX} - HB_{MAX} > D_{MAX}$$

10. The optical lens system according to claim 1, wherein a maximum dimension $H_{MAX}$ (mm) of the first lens in the sub-scanning direction and a maximum dimension $HB_{MAX}$ (mm) of the effective lens portion of the first lens in the sub-scanning direction satisfies a following expression:

$$HB_{MAX} < H_{MAX} \leq 3 HB_{MAX}$$

11. The optical lens system according to claim 1, wherein a maximum dimension $HB_{MAX}$ (mm) of the effective lens portion of the first lens in the sub-scanning direction and a diameter φ (mm) of the laser beam transmitted through the effective lens portion satisfies a following expression:

$$\phi+1.5 < HB_{MAX} \leq 3(\phi+1.5)$$

12. The optical lens system according to claim 1, wherein the first lens further includes at least one positioning projection which positions the first lens in at least one of the main scanning direction and the optical-axis direction.

13. The optical lens system according to claim 12, wherein said at least one positioning projection projects outward from at least one of two opposite end surfaces of the first lens in the sub-scanning direction, and a dimension RD (mm) of said at least one positioning projection in the optical-axis direction is smaller than a maximum dimension $D_{MAX}$ (mm) of the first lens in the optical-axis direction.

14. The optical lens system according to claim 12, wherein said at least one positioning projection projects outward from at least one of two opposite end surfaces of the first lens in the sub-scanning direction, and a dimension RL (mm) of said at least one positioning projection in the main scanning direction is smaller than a dimension L (mm) of the effective lens portion of the first lens in the main scanning direction.

15. The optical lens system according to claim 12, wherein the first lens further includes at least one second ineffective lens portion which does not transmit the laser beam therethrough and which is located adjacent the effective lens portion in the main scanning direction, and said at least one positioning projection is provided in said at least one second ineffective lens portion.

16. The optical lens system according to claim 1, wherein the first lens further includes two extended portions which are extended, in a forward direction of the optical-axis direction, from two opposite end portions of the first lens, respectively, that are opposite to each other in the main scanning direction, and respective free end portions of the two extended portions are located outside a forward outermost portion of the effective lens portion in the optical-axis direction.

17. An optical scanning apparatus, comprising:
a laser-beam emitter which emits, based on image data, a laser beam;
a polygon mirror which is rotated by a drive motor to deflect the laser beam in a main scanning direction; and
an optical lens system including a plurality of optical lenses which cooperate with each other to transmit the laser beam deflected in the main scanning direction to scan an object in the main scanning direction, and which include a first lens which is formed of a resin and has a tilt correction function, and at least one second lens which is remoter from the object than the first lens on an optical path and has an fΘ function of converting a scanning speed at which the deflected laser beam scans the object,
the first lens, including:
an effective lens portion which transmits the laser beam therethrough, the effective lens portion having an incidence surface to which the laser beam is incident in an optical-axis direction, and an outgoing surface from which the laser beam outgoes in the optical-axis direction, and at least one of the incidence surface and the outgoing surface being curved outward such that in a cross section of the first lens taken along a plane perpendicular to the main scanning direction, two opposite edge lines of the effective lens portion that are opposite to each other in the optical-axis direction and correspond to the incidence surface and the outgoing surface, respectively, include at least one outward curved line that is curved outward in the optical-axis direction, and
at least one first ineffective lens portion which does not transmit the laser beam therethrough, and which is located adjacent the effective lens portion in a sub-scanning direction perpendicular to the main scanning direction and the optical-axis direction, wherein in the cross section of the first lens, said at least one first ineffective lens portion does not project outward from the outward curved surface of the effective lens portion in the optical-axis direction.

18. The optical scanning apparatus according to claim 17, wherein the object comprises a photosensitive body, and the laser beam transmitted through the optical lens system scans the photosensitive body to form an electrostatic latent image thereon.

19. An image forming apparatus, comprising:
an optical scanning apparatus, including:
a laser-beam emitter which emits, based on image data, a laser beam,
a polygon mirror which is rotated by a drive motor to deflect the laser beam in a main scanning direction; and
an optical lens system including a plurality of optical lenses which cooperate with each other to transmit the laser beam deflected in the main scanning direction to scan an object in the main scanning direction, and which include a first lens which is formed of a resin and has a tilt correction function, and at least one second lens which is remoter from the object than the first lens on an optical path and has an fΘ function of converting a scanning speed at which the deflected laser beam scans the object;
the first lens, including:
an effective lens portion which transmits the laser beam therethrough, the effective lens portion having an incidence surface to which the laser beam is incident in an optical-axis direction, and an outgoing surface from which the laser beam outgoes in the optical-axis direction, and at least one of the incidence surface and the outgoing surface being curved outward such that in a cross section of the first lens taken along a plane perpendicular to the main scanning direction, two opposite edge lines of the effective lens portion that are opposite to each other in the optical-axis direction and correspond to the incidence surface and the outgoing surface, respectively, include at least one outward curved line that is curved outward in the optical-axis direction, and
at least one first ineffective lens portion which does not transmit the laser beam therethrough, and which is located adjacent the effective lens portion in a sub-scanning direction perpendicular to the main scanning direction and the optical-axis direction, wherein in the cross section of the first lens, said at least one first ineffective lens portion does not project outward from the outward curved surface of the effective lens portion in the optical-axis direction;
a photosensitive body on which an electrostatic latent image is formed by the laser beam transmitted through the optical lens system of the optical scanning apparatus;
a developing device which supplies a developing material to the electrostatic latent image and thereby forms a developing-material image on the photosensitive body; and a transferring device which transfers the developing-material image from the photosensitive body to a transfer object.

20. The image forming apparatus according to claim 19, wherein the transfer object comprises a recording medium, and the image forming apparatus further comprises a fixing device which fixes the developing-material image to the recording medium.

* * * * *